Patented Aug. 11, 1936

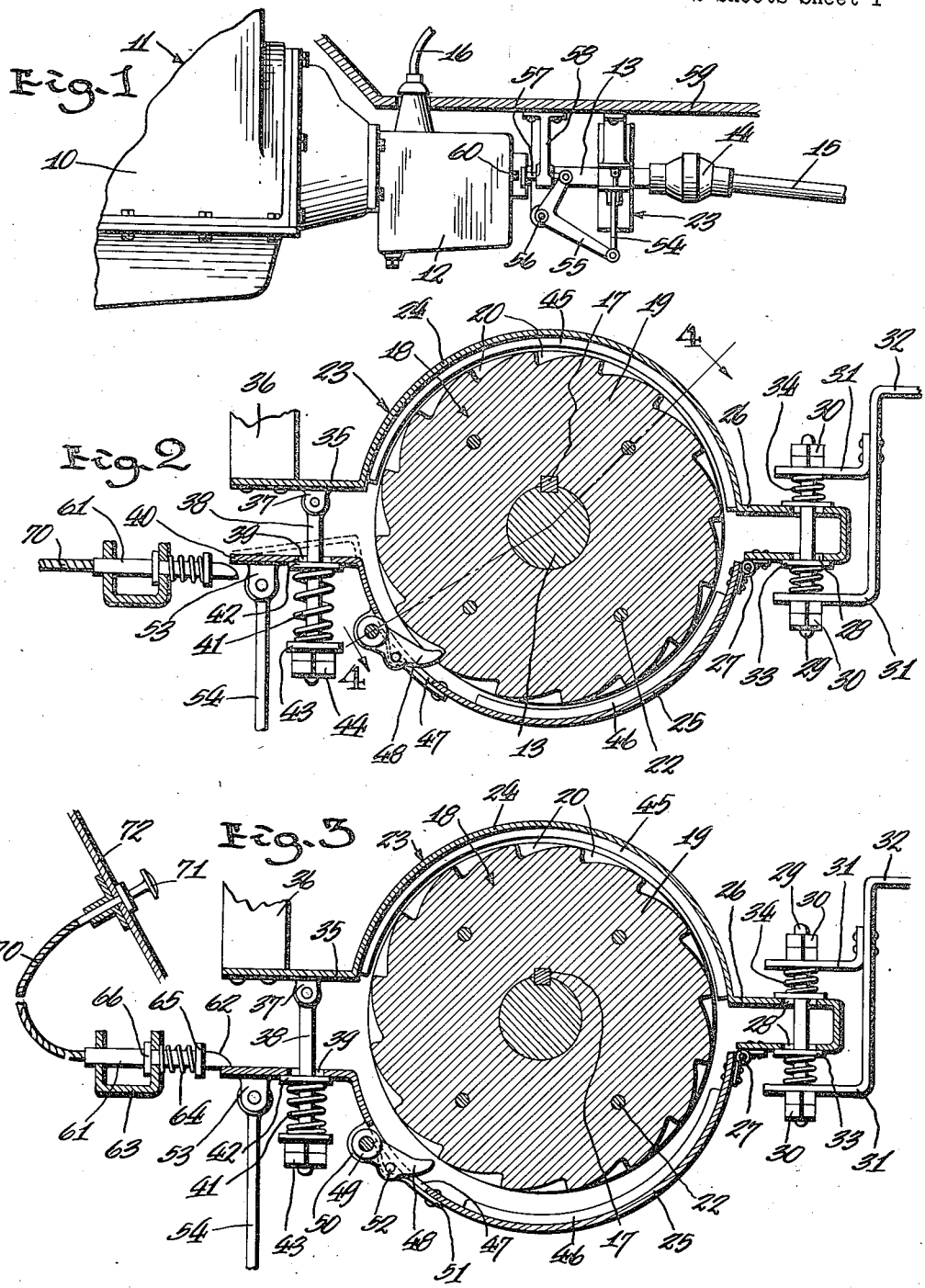

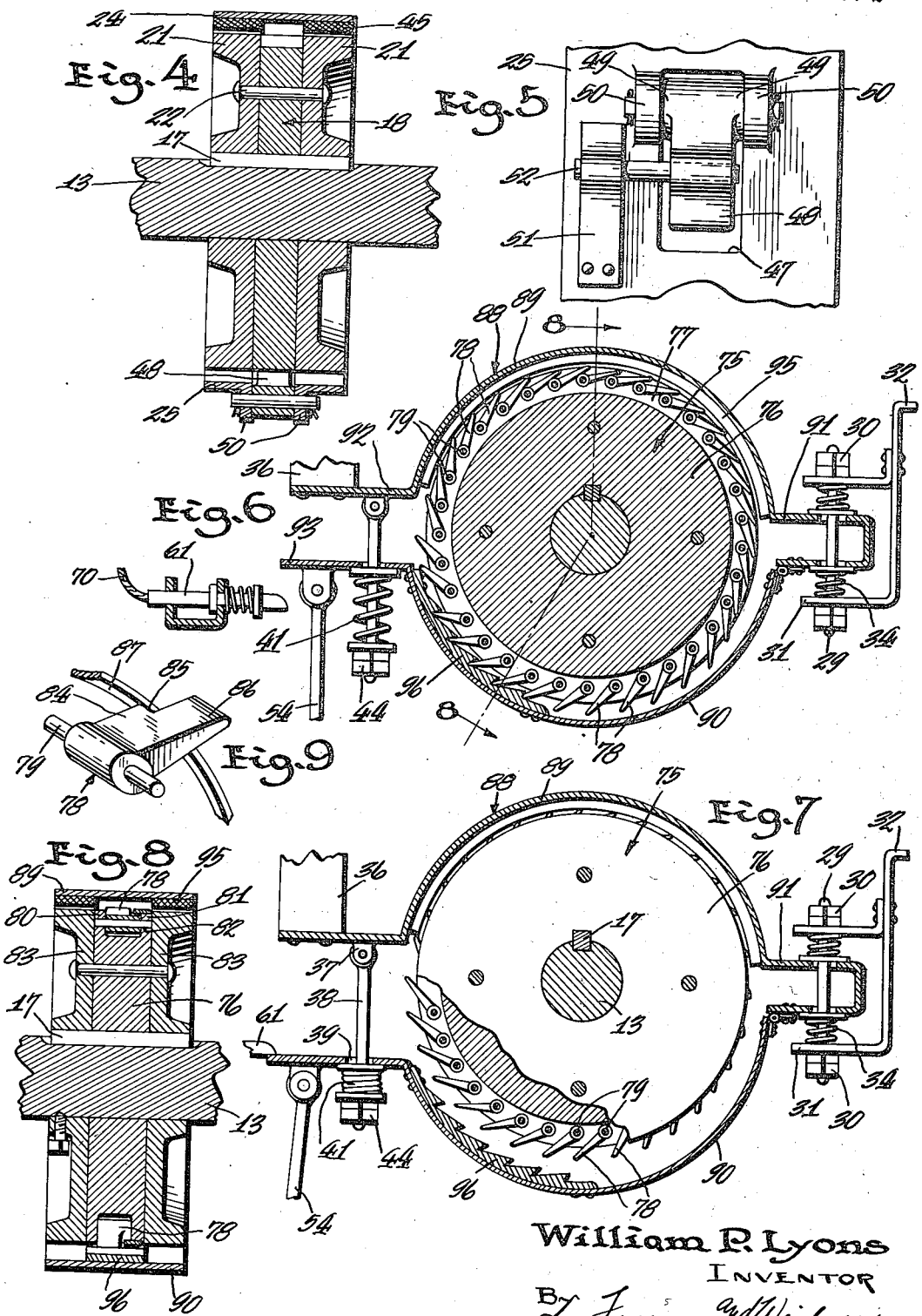

2,050,759

UNITED STATES PATENT OFFICE 2,050,759

VEHICLE REVERSE BRAKE MECHANISM

William P. Lyons, Cleveland, Ohio

Application March 20, 1933, Serial No. 661,701

7 Claims. (Cl. 192—4)

This invention relates to brake mechanism, and has for an object the provision of a new and improved mechanism of this character.

In the drawings accompanying this specification and forming a part of this application I have shown, for purposes of illustration, certain embodiments which my invention may assume, and in these drawings:

Figure 1 is a side elevational view showing the application of my invention to a driven shaft of an automobile, Figure 2 is an enlarged fragmentary, vertical transverse sectional view of an embodiment of the invention, showing parts thereof in one operative position, Figure 3 is a view similar to Figure 2, showing parts thereof in another operative position, Figure 4 is a vertical longitudinal sectional view, corresponding substantially to the line 4—4 of Figure 2, Figure 5 is an enlarged elevational view of the pawl means employed in the embodiment disclosed in Figure 2, Figure 6 is a fragmentary, vertical transverse sectional view of another embodiment of the invention, illustrating parts thereof in one operative position, Figure 7 is a view similar to Figure 6, showing the mechanism in another operative position, Figure 8 is a vertical longitudinal sectional view, corresponding substantially to the line 8—8 of Figure 6, while Figure 9 is a perspective view of means for limiting movement of the pawl means.

Referring first to Figures 1 through 5, the embodiment therein disclosed comprises an engine 10 of an automobile 11, or the like, not completely shown, provided with a variable speed transmission mechanism enclosed in a housing 12 connected to a driven shaft 13 which is connected by means of a universal joint 14 with a shaft 15 connected with a differential mechanism, not shown, of the automobile 11, and the variable speed transmission mechanism is operated by a gear shift lever 16, partly shown.

Rigidly affixed to the shaft 13, by means of a key slot and key 17, is a brake wheel 18, comprising a disk 19 notched in its outer peripheral surface to form annularly arranged ratchet teeth 20, and the disk 19 is interposed between the brake drums 21 of a diameter equal to the disk 19, which is fixedly secured to the brake drums 21 by rivets 22, or other suitable means.

Disposed about the brake wheel 18 is a brake shoe 23 divided into an upper brake shoe 24 and a lower brake shoe 25; the upper brake shoe 24 being provided at one end portion with a laterally extending U-shaped projection 26, to which the lower brake shoe 25 is swingably mounted by means of a hinge 27, and the U-shaped projection 26 has oppositely disposed apertures 28 in the stem portions thereof, for loosely accommodating a pin 29 screw-threaded at its opposite ends for engagement with lock nuts 30 normally abutting against the stems 31 of a correspondingly U-shaped bracket 32 which is rigidly mounted on the automobile 11. Loosely disposed about the pin 29, exteriorly of the U-shaped projection 26, are washers 33 which form a seat for one end of the springs 34 interposed between the washers 33 and the stems 31 of the bracket 32. The opposite end of the upper brake shoe 24 has a laterally extending shoulder 35 which is rigidly secured to the automobile 11, as indicated at 36, and is provided with a bifurcated lug 37 which pivotally engages a rod 38 loosely disposed through an aperture 39 located in a correspondingly laterally projecting shoulder 40 of the lower brake shoe, 25, which is yieldably held in operative positions by a spring 41 interposed between a washer 42 adjacent the shoulder 40 and a washer 43 secured to the rod 38 by lock nuts 44 threaded to the outer extremity thereof.

Mounted on the inner surface of the upper brake shoe 24 are brake bands 45 of suitable frictional material, spaced laterally with respect to each other and disposed adjacent the outer periphery of the brake drums 21, and the lower brake shoe 25 is similarly provided, partly along its inner surface, with brake bands 46, the brake bands 45 and 46 being adapted to gradually engage the oppositely disposed brake drums 21 upon contraction of the brake shoe 23.

The lower brake shoe 25 is provided with an aperture 47 through which is swingably disposed a pawl 48 having trunnions 49 pivotally mounted in ears 50 integral with the lower brake shoe 25, and the pawl 48 is normally held in relatively light engagement with the ratchet teeth 20 by means of a spring 51 having one end portion in contact with a pin 52 rigidly secured to the pawl 48 and the other end riveted to the lower brake shoe 25.

The shoulder 40 of the lower brake shoe 25 has a bifurcated lug 53 which pivotally engages a link 54 pivotally connected to one end of a bell crank lever 55 which is pivotally supported intermediate its ends, as indicated at 56, and the other end of the bell crank lever 55 is pivotally connected to a rod 57 slidably mounted in a bracket 58 attached to the floor board 59 of the automobile 11, and the rod 57 is adapted to abut against the reverse gear shaft 60 projecting through the housing 12 when the gear shift lever 16 is put into reverse gear, whereby the rod 57 is shifted to the rear, and the bell crank lever 55 is swung downwardly, pulling the lower brake shoe 25 downwardly, causing it to swing about the hinge 27 to a free position, as indicated in Figure 3, moving the pawl 48 out of engagement with the ratchet teeth 20.

Auxiliary locking means are provided to retain the lower brake shoe 25 in the free position, caused by placing the gear shift lever 16 in reverse gear, after the gear shift lever 16 is moved out of reverse gear, and comprises a dog 61 of rectangular cross-section having one end chamfered, as indicated at 62, disposed adjacent the shoulder 40 of the lower brake shoe 25, and adapted to engage the outer extreme edge of the shoulder 40 while the lower brake shoe 25 is being pulled downwardly to free position, by shifting the gear shift lever 16 into reverse gear, and the lower surface of the dog 61 is then adapted to engage the upper surface of the shoulder 40, as indicated in Figure 3, to retain the brake shoe 25 in its free position. And the dog 61 is slidably mounted in a bracket 63 rigidly secured to the automobile 11, and is normally held in extended position with respect to the bracket 63 by means of a spring 64 interposed between the bracket 63 and a collar 65 adjacent the chamfered surface 62, and the dog 61 is limited in its extended movement by a collar 66 normally engaging the bracket 63. A flexible wire cable 70, or the like, is connected to one end of the dog 61 and the opposite end is secured to a knob 71 slidably mounted in the dashboard 72 of the automobile 11, within easy reach of the driver, whereby an outward pull on the knob 71 will withdraw the dog 61 from engagement with the shoulder 40 of the lower brake shoe 25, which is then automatically snapped upwardly by the action of the spring 41, to maintain the lower brake shoe 25 in its normal position.

In operation, assuming that the automobile is moving forwardly, the brake wheel 18 is then rotating in a counter-clockwise direction, and the pawl 48 bears lightly against the outer peak portions of the ratchet teeth 20 without interfering with the rotation of the brake wheel 18. If the automobile is stopped and begins to move backwardly, when not in reverse gear, the brake wheel 18 then begins to rotate in a clockwise direction, and the pawl 48 immediately engages one of the ratchet teeth 20, and the brake wheel 18, upon further rotating in a clockwise direction, moves the lower brake shoe 25 upwardly to the left and the brake shoe 24 downwardly to the right, as viewed in Figure 2, and causes the brake bands 45 and 46 to gradually engage the brake drums 21, whereby further clockwise rotation of the brake wheel 18 is checked and the backward movement of the automobile also is checked, by the combined action of the ratchet teeth 20 engaging the pawl 48, and the brake bands 45 and 46 engaging the brake drums 21.

The pawl 48 is releasably retained out of engagement with the ratchet teeth 20, or in free position, by shifting the gear shift lever 16 into reverse gear, causing the reverse gear shaft 60 to abut the rod 57 and rotate the bell crank lever 55, pulling the lower brake shoe 25 entirely free of the brake wheel 18, and the automobile 11 can be moved backwardly under power from the engine 10. The dog 61 holds the lower brake shoe 25 in its free position after the gear lever 16 is shifted out of reverse gear, and the automobile is allowed to be moved backwardly without the aid of the engine 10. The brake shoe 25 is locked in this free position until the knob 71 is pulled outwardly, which moves the dog 61 out of engagement with the shoulder 40 of the lower brake shoe 25, and the latter is shifted to its normal position by the spring 41 which also shifts the rod 57 into position so as to contact the reverse gear shaft 60 when the gear shift lever 16 is again shifted into reverse gear.

Referring now to Figures 6 through 9, the embodiment disclosed therein includes a brake wheel 75 rigidly secured by means of the key slot and key 17 to the driven shaft 13, and comprises a disk 76 provided in its outer periphery with an annular groove 77, in which are a plurality of annularly spaced pawls 78 pivotally mounted on pins 79 extending loosely through the walls 80 and 81 of the groove 77, as indicated at 82, the wall 81 being of smaller diameter than the wall 80 for a purpose hereinafter described, and the pins 79 are releasably retained in the pawls 78 by brake drums 83 riveted to the opposite sides of the disk 76. The pawls 78 are tapered inwardly at their outer ends and have a reduced section 84 which forms a shoulder 85 with the larger section 86 thereof, and the pawls 78 are limited in their outward rotative movement with respect to the disk 76 by means of a band 87 circumferentially disposed about the smaller annular wall 81 and lapping partly over the annular groove 77 so as to contact the shoulders 85 of the pawls 78.

Disposed about the brake wheel 75 is a brake shoe 88 divided into an upper brake shoe 89 and a lower brake shoe 90, the upper brake shoe 89 having a laterally extending U-shaped projection 91 and a laterally extending shoulder 92 and the lower brake shoe 90 having a laterally extending shoulder 93 yieldably held in position by the spring arrangement 41, all of which are respectively constructed and supported in identically the same manner as the upper brake shoe 24, U-shaped projection 26, and shoulders 35 and 40 hereinbefore described.

Mounted on the inner surface of the upper brake shoe 89 are brake bands 95 of suitable frictional material, spaced laterally with respect to each other disposed adjacent the brake drums 83; and mounted on the lower brake shoe 90 adjacent the shoulder 93 are a plurality of teeth 96 presenting a ratchet toothed surface normally held in relatively light contact with the pawls 78 by means of the pivotal engagement of the latter in the disk 76.

In operation, assuming that the automobile is moving forwardly, the brake wheel 75 is then rotating in a counterclockwise direction and the pawls 78 ride freely over the ratchet teeth 96, bearing lightly thereon. If the automobile moves backwardly but not in reverse gear, the brake wheel 75 rotates in a clockwise direction and the pawls 78 immediately engage the ratchet teeth 96, and the brake wheel 75 upon further clockwise rotation moves the lower brake shoe 90 upwardly to the left and the upper brake shoe 89 downwardly to the right, and checks the movement of the brake wheel 75, which also stops the backward movement of the automobile. The movement of the brake wheel 75 is also checked by the brake bands 95 which gradually engage the brake drums 83 as the brake shoe 88 is moved circumferentially with respect to the brake wheel 75 through locking engagement of the pawls 78 with the ratchet teeth 96.

The ratchet teeth 96 are held free of the pawls 78, as shown in Figure 7, by shifting the gear shift lever 16 into reverse gear, which causes the dog 61 to engage the shoulder 93, the operation of which is identical to that hereinbefore described.

It will be perceived that I have provided a brake mechanism that is particularly adapted for automobiles in that it prevents accidental backward movement of the automobile and permits backward movement thereof only when the automobile is in reverse gear, or when held in free or unlocking position by means of the dog 61. The braking or locking action is gradual in application and effect, as the relatively loose accommodation of the pin 29 and rod 38 with their associated parts permits the brake shoes 23 and 88 to move circumferentially with respect to the brake wheels 18 and 75 respectively; and the springs 34 movably retain the brake shoes 23 and 88 in a centrally disposed position with respect to the brake wheels 18 and 75 respectively, and also cushion the engagement of the braking members. My device need not be located on a driven shaft of an automobile, but can be used on all types of engines, vehicles, or the like to prevent accidental retrograde movement of parts thereof.

From the foregoing, it will be apparent to those skilled in the art that the embodiments herein disclosed accomplish at least the principal object of the invention, but also, that the constructions are adapted to a wide variety of uses, and embody advantages other than those herein discussed, and also, that the particular embodiments may be variously changed and modified without departing from the spirit or scope of the invention, and accordingly, it will be understood that the above disclosures are illustrative only, and that my invention is not limited thereto.

I claim:

1. Mechanism for counteracting retrograde rotation of a shaft, comprising: a first means connected to and movable with said shaft, and a second means mounted adjacent to said first means, one of said means including ratchet teeth and the other of said means including a pivoted pawl, said pawl and ratchet being operable to allow rotation in one direction, but to check retrograde rotation, said second means having a phase of limited relative movement with respect to said first means subsequent to engagement of said pawl and ratchet; a brake band carrying one of said means operable during said phase to retard relative movement between said first and second means; yieldable means normally urging said pawl and ratchet and said brake band to engaged position; and trigger mechanism for holding said pawl and ratchet and said brake band out of engagement, and releasable to effect engagement under influence of said yieldable means.

2. Mechanism for counteracting retrograde rotation of a shaft, comprising: a first means connected to and movable with said shaft, and a second means mounted adjacent to said first means, one of said means including ratchet teeth and the other of said means including a pawl, said pawl and ratchet being operable to allow rotation in one direction, but to check retrograde rotation; and a brake band carrying one of said means and movable therewith to contract said band when said means are interengaged; said pawl being pivoted to move independently of the movement of said brake band.

3. Mechanism for counteracting retrograde rotation of an automobile drive shaft, comprising: a first means connected to and movable with said shaft, and a second means mounted adjacent to said first means, one of said means including ratchet teeth and the other of said means including a pivoted pawl, said pawl and ratchet being operable to allow rotation in one direction, but to check retrograde rotation, said second means having a phase of limited relative movement with respect to said first means subsequent to engagement of said pawl and ratchet; a brake band carrying one of said means operable during said phase to retard relative movement between said first and second means; yieldable means normally urging said pawl and ratchet and said brake band to engaged position; trigger mechanism for holding said pawl and ratchet and said brake band out of engagement, and releasable to effect engagement under influence of said yieldable means; and means operable by movement of the gear shift lever of said automobile in a reverse direction to disengage said pawl and ratchet and said brake band during the period of release of said trigger mechanism.

4. Mechanism for counteracting retrograde rotation of a shaft, comprising: a first means connected to and movable with said shaft, and a second means mounted adjacent to said first means, one of said means including ratchet teeth and the other of said means including a pawl, said pawl and ratchet being operable to allow rotation in one direction, but to check retrograde rotation, said second means having a phase of limited relative movement with respect to said first means subsequent to engagement of said pawl and ratchet; a movably mounted brake band carrying one of said means operable during said phase to retard relative movement between said first and second means, said pawl being pivoted to have movement independent of the movement of said brake band; yieldable means normally urging said pawl and ratchet and said brake band to engaged position; and trigger mechanism for holding said pawl and ratchet and said brake band out of engagement, and releasable to effect engagement under influence of said yieldable means.

5. Mechanism for counteracting retrograde rotation of a shaft; pawl and ratchet members for preventing retrograde rotation of said shaft, one of said members being fixed to said shaft; brake means fixed at one end, extending about said first member, and at its free end carrying another of said members; and means for yieldably supporting said brake means intermediate its ends.

6. Mechanism for counteracting retrograde rotation of a shaft; pawl and ratchet members for preventing retrograde rotation of said shaft, one of said members being fixed to said shaft; a smooth-surfaced drum mounted at one side of said ratchet member and moveable therewith; and a brake band having a second of said members engageable with the member on said shaft, and carrying a brake lining engageable with said drum.

7. Mechanism for counteracting retrograde rotation of a shaft comprising: a member rotatable with said shaft; a plurality of pawls pivoted to the periphery of said member and circumferentially extensible; means engageable with said pawls and operable to check retrograde rotation of said shaft; and means for limiting circumferential extension of said pawls when said shaft is rotated.

WILLIAM P. LYONS.